(12) United States Patent
Tripathy et al.

(10) Patent No.: US 11,405,504 B1
(45) Date of Patent: Aug. 2, 2022

(54) SYSTEM AND METHODS FOR USING REAL-TIME CONTEXT TO PROACTIVELY START A COMMUNICATION WITH A CUSTOMER THROUGH A DIFFERENT DEVICE

(71) Applicant: Helpshift, Inc., San Francisco, CA (US)

(72) Inventors: Abinash Tripathy, San Francisco, CA (US); Adityo Deshmukh, Maharashtra (IN); Erik Richard Ashby, Lehi, UT (US)

(73) Assignee: Helpshift, Inc., San Francisco, CA (US)

( * ) Notice: Subject to any disclaimer, the term of this patent is extended or adjusted under 35 U.S.C. 154(b) by 0 days.

(21) Appl. No.: 17/203,022

(22) Filed: Mar. 16, 2021

Related U.S. Application Data

(60) Provisional application No. 62/992,374, filed on Mar. 20, 2020.

(51) Int. Cl.
*H04M 3/51* (2006.01)
*G06Q 30/00* (2012.01)
*H04L 9/32* (2006.01)

(52) U.S. Cl.
CPC ........ *H04M 3/5141* (2013.01); *G06Q 30/016* (2013.01); *H04L 9/3213* (2013.01); *H04L 9/3228* (2013.01); *H04M 3/5191* (2013.01)

(58) Field of Classification Search
CPC .......................... H04M 3/5141; H04M 3/5191; G06Q 30/016; H04L 9/3228; H04L 9/3213

USPC .... 379/265.09, 242, 265.05, 265.11, 207.11, 379/207.02
See application file for complete search history.

(56) References Cited

U.S. PATENT DOCUMENTS

| | | | |
|---|---|---|---|
| 2015/0326692 A1* | 11/2015 | Kaneko | G06F 21/41 713/171 |
| 2017/0230351 A1* | 8/2017 | Hallenborg | H04L 63/101 |
| 2017/0237734 A1* | 8/2017 | Hallenborg | H04L 63/0884 726/7 |

* cited by examiner

*Primary Examiner* — Thjuan K Addy
(74) *Attorney, Agent, or Firm* — FisherBroyles LLP; Alan D. Minsk

(57) ABSTRACT

Systems, apparatuses, and methods for providing support or service to a customer, such as a user of a service or product. The support or service may include one or more of assistance with operation, registration, configuration, trouble shooting, account creation, installation of software, replacement, repair, payment for services, and obtaining coverage under a warranty. A bootstrap code or other form of data is generated by a customer support provider and is transferred to the customer and used to authenticate the customer and enable access to securely stored contextual information regarding the device and/or identification information regarding the customer. The code may be provided by the customer support provider to a company and then provided to the customer.

24 Claims, 8 Drawing Sheets

SYSTEM AND METHODS FOR USING REAL-TIME CONTEXT TO PROACTIVELY START A COMMUNICATION WITH A CUSTOMER THROUGH A DIFFERENT DEVICE

CROSS REFERENCE TO RELATED APPLICATIONS

This application claims the benefit of U.S. Provisional Application No. 62/992,374, entitled "System and Methods for Using Real-Time Context to Proactively Start a Communication with a Customer through a Different Device," filed Mar. 20, 2020, the disclosure of which is incorporated, in its entirety (including the Appendix), by this reference.

BACKGROUND

Providing efficient and effective customer support is essential to the successful operation of most businesses. This is more than just a guideline or observation, as assisting customers or prospective customers with resolving the issues they encounter using products and services is often a key to successful onboarding and customer retention. For example, a customer or prospective customer may require assistance in configuring a device or service, in operating a device, in establishing an account, in making a payment, etc. Each of these needs for assistance should be addressed both quickly and correctly to ensure a good customer experience and continued use of the product or service.

Whereas previously the primary method of accessing a customer service representative was a telephone call, this method of contact has expanded to include email. However, even with the additional communication channel provided by email, today's customer engagement with companies providing a product or service is reactive and is based on the use of those legacy communication channels.

Conventional approaches to providing customers with access to support and assistance with products or services is based on legacy communication channels such as telephone and email. These conventional approaches suffer from one or more disadvantages, including being reactive and often lacking relevant contextual information regarding the current state of a problem (which in some cases must be provided by the customer). Embodiments of the disclosure are directed toward solving these and other problems individually and collectively.

SUMMARY

The terms "invention," "the invention," "this invention," "the present invention," "the present disclosure," or "the disclosure" as used herein are intended to refer broadly to all of the subject matter described in this document, the drawings or figures, and to the claims. Statements containing these terms should be understood not to limit the subject matter described herein or to limit the meaning or scope of the claims. Embodiments covered by this disclosure are defined by the claims and not by this summary. This summary is a high-level overview of various aspects of the disclosure and introduces some of the concepts that are further described in the Detailed Description section below. This summary is not intended to identify key, essential or required features of the claimed subject matter, nor is it intended to be used in isolation to determine the scope of the claimed subject matter. The subject matter should be understood by reference to appropriate portions of the entire specification, to any or all figures or drawings, and to each claim.

As mentioned, present forms of customer engagement with companies providing a product or service is typically reactive and based on using legacy communication channels such as telephone and email. However the inventors have developed an approach for providing customer service that is more automated and pro-active, and leverages modern digital capabilities and communication channels such as (text) messaging, chat bots, digital assistants and artificial intelligence techniques to make the customer service experience more relevant and efficient.

An important factor in enabling automated, effective and pro-active customer support interactions is provision of relevant data and context to the entity providing the customer support or service. In some embodiments, the described system, apparatuses, and methods enable engagement by a customer with a customer service or support entity (e.g., a customer service platform, person, application or (chat)bot) that is initiated using a physical or digitally represented bootstrap "code".

In some embodiments, the code is provided with a physical product, such as by being part of a label or "tag" (RFID, NFC, or other similar form of device or element that is capable of exchanging data with another device or application). In some embodiments, the code may be transferred to an electronic device of a customer and caused to be displayed on the device. In some embodiments, the code may be transferred to a customer in the form of an image provided to a device using text messaging, email, a wireless communications technique, etc.

In some embodiments, the bootstrap code or other form of data is generated by a customer support provider/platform and is transferred to the customer and used to authenticate the customer and enable access to securely stored contextual information regarding the device and/or identification information regarding the customer (e.g., device model, device configuration, device features, customer identification, customer location, etc.). In some embodiments, the code may be provided by a customer support or service platform (such as that operated by the assignee of the present application) to a company and then provided to the customer. In some embodiments, the company is a manufacturer of the device or an organization that sold the device to the customer (and with whom they may have a customer service or support agreement or warranty).

Embodiments of the disclosure are directed to systems, apparatuses, and methods for more effectively providing automated or semi-automated customer support services while maintaining the security of customer and device data and information. In some embodiments, these capabilities and functions are provided by obtaining and securely storing information regarding one or more of a customer, a device, or a service and providing a token or code to the customer when they require assistance. The token or code enables the customer to identify themselves with the entity providing the customer service assistance and also enables that entity to access the securely stored information. In some embodiments, the stored information may include information regarding the customer, device, or service that is obtained contemporaneously with the customer's need for assistance. For example, the information may include an error message or status flag for a device, or a location of a customer.

Other objects and advantages of the systems and methods described will be apparent to one of ordinary skill in the art upon review of the detailed description and the included figures. Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the present disclosure covers all modifications, equivalents, and alternatives falling within the scope of the appended claims.

BRIEF DESCRIPTION OF THE DRAWINGS

Embodiments of the system and methods in accordance with the present disclosure will be described with reference to the drawings, in which.

Note that the same numbers are used throughout the disclosure and figures to reference like components and features.

DETAILED DESCRIPTION

Figure 1:
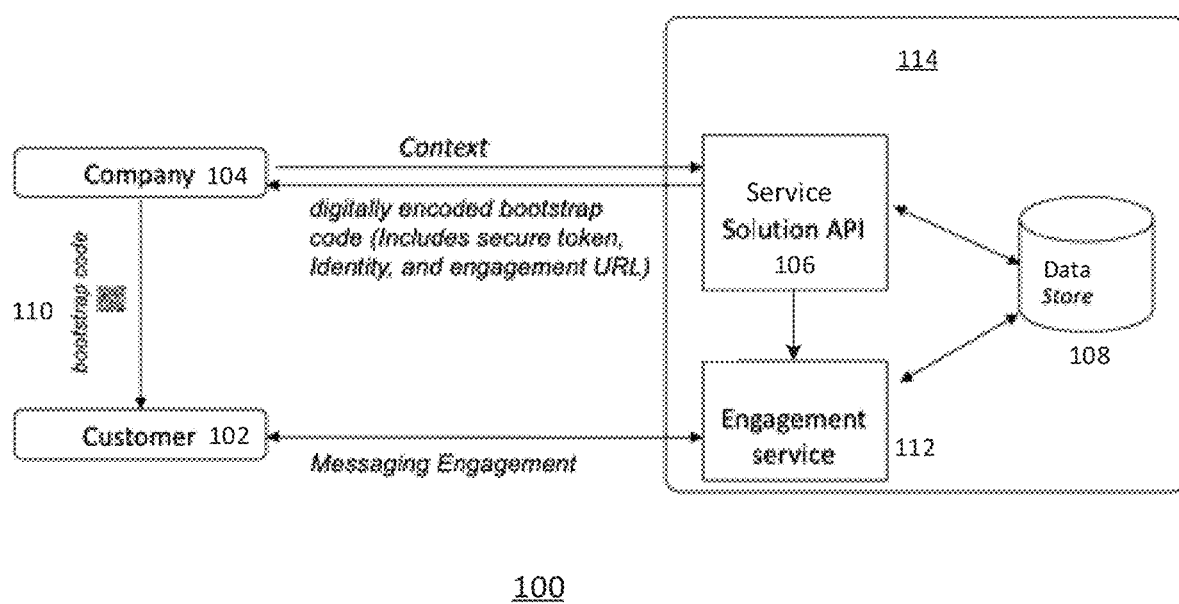
FIG. 1 is a diagram illustrating the primary elements or functions of an example system for providing customer service or support, in accordance with an embodiment of the systems, apparatuses, and methods described herein.

The subject matter of embodiments of the present disclosure is described herein with specificity to meet statutory requirements, but this description is not intended to limit the scope of the claims. The claimed subject matter may be embodied in other ways, may include different elements or steps and may be used in conjunction with other existing or later developed technologies. This description should not be interpreted as implying any required order or arrangement among or between various steps or elements except when the order of individual steps or arrangement of elements is explicitly noted as being required.

Embodiments of the disclosure will be described more fully herein with reference to the accompanying drawings, which form a part hereof, and which show, by way of illustration, exemplary embodiments by which the disclosure may be practiced. The disclosure may, however, be embodied in different forms and should not be construed as limited to the embodiments set forth herein; rather, these embodiments are provided so that this disclosure will satisfy the statutory requirements and convey the scope of the disclosure to those skilled in the art.

Among other things, the present disclosure may be embodied in whole or in part as a system, as one or more methods, or as one or more devices. Embodiments of the disclosure may take the form of a hardware implemented embodiment, a software implemented embodiment, or an embodiment combining software and hardware aspects. For example, in some embodiments, one or more of the operations, functions, processes or methods described herein may be implemented by one or more suitable processing elements (such as a processor, microprocessor, CPU, GPU, TPU, controller, etc.) that is part of a client device, server, network element, remote platform (such as a SaaS platform), an "in the cloud" service, or other form of computing or data processing system, device, or platform.

The processing element or elements may be programmed with a set of executable instructions (e.g., software instructions), where the instructions may be stored on (or in) one or more suitable non-transitory data storage elements. In some embodiments, one or more of the operations, functions, processes, or methods described herein may be implemented by a specialized form of hardware, such as a programmable gate array, application specific integrated circuit (ASIC), or the like. Note that an embodiment of the described methods may be implemented in the form of an application, a sub-routine that is part of a larger application, a "plug-in", an extension to the functionality of a data processing system or platform, or other suitable form. The following detailed description is, therefore, not to be taken in a limiting sense.

Embodiments of the systems, apparatuses, and methods described herein are directed to providing efficient and effective support or service to a customer, such as a user of a service or product. The support or service may include but is not limited to one or more of assistance with operation, registration, configuration, trouble shooting, account creation, installation of software, replacement, repair, payment for services, and obtaining coverage under a warranty.

As mentioned, conventional systems and methods for providing customer support suffer from one or more significant disadvantages which compromise the ease of use and effectiveness of the support services. These disadvantages are typically one or more of:

Requiring that the customer initiate contact to start a conversation or submit a service request (such as dialing a phone number, visiting a website, or sending an email);

A customer may be unable to engage with support services when assistance is most needed (such as when they have a problem on a device; in this situation they must start a support conversation on another device or at another time);

Relevant contextual information, such as what device is encountering a problem, the nature of the problem, what store a device was purchased from, how a device has been configured, etc. is not automatically included in the support request or records available to a service provider;

This sometimes requires a customer to find a serial number or model number on a device, determine what version of software is installed on a device, or even use the device to report a problem with it;

As a result, customers are often provided with a "generic" and unfocused support experience;

This is at least partially a result of conventional systems not being capable of collecting and securely storing more specific information (and in some cases personal data) that may be relevant to servicing a request for support or assistance.

As will be described in greater detail, one or more embodiments of the system, apparatuses, and methods described herein are able to overcome these and other disadvantages of conventional systems for providing customer support.

In general terms, embodiments of the system, apparatuses, and methods described herein for providing customer support or service include or implement one or more of the following processes, operations, or functions:

Collection of (or otherwise obtaining) device and/or customer information:
  Customer information may include one or more of customer name, address, contact information, place of purchase, date of purchase, customer location etc.;
  Device information may include one or more of device type, device model, device serial number, device configuration (such as operating system, firmware version), current device status, device method of connecting to customer service entity, or other relevant information regarding the operation, configuration, or condition of the device;
    In some cases, this information may be obtained from a company that manufactured the device or sold the device to the customer;
    In some cases, this information may be obtained in real-time or pseudo real-time from the device and represented by an error code, alert, or other indicator of a problem or need for customer assistance;
Storage of the collected information and data in a secure manner, and typically associated with a unique identifier;
Generation of a token or code that includes the unique identifier (or an encoded version of it) and may also include other information about the customer or device;
Providing the generated token or code (or other form of identifier) to the customer, either directly from the entity that generated the token or code or from an intermediary entity (such as the manufacturer or sever of the device who obtained the token or code from a customer support or customer service entity that generated the code);
Receiving the token or code from the customer;
  a verifying the token or code's authenticity;
  using the token or code to access the securely stored information and data; and
  a initiating a customer service or support engagement with the customer:
    where the customer support engagement may be initiated by any suitable technique or communications method, including but not limited to email, text, phone call, chat bot, directing a customer to a URL, a list of FAQs, etc.

In one embodiment, the bootstrap code (containing or enabling access to securely stored information regarding a device and/or customer) may be included in (or on) a physical package containing the device. In this embodiment, the code may include a way to access information (such as a URL) regarding typical problems or errors that have been found most likely to occur for that product. In another embodiment, the code can be generated in real-time by a customer service platform and presented or displayed to a customer when an error, fault, or operational issue is encountered (such as a need for a device reset, a need for a download of instructions, a problem with device or application configuration, a security patch to software or firmware, etc.) Regardless of how generated, when generated, or how provided to a customer, the code may be used to initiate an interaction with a customer support entity while in some cases also providing access to stored contextual and/or identification information that will assist the support entity to provide automated or semi-automated interactions between the customer and the entity to provide assistance to the customer.

In addition, the system, apparatuses, and methods described herein provide controlled access to the device for purposes of evaluation or configuration, and secure storage for contextual and customer identification information; these aspects are lacking in conventional approaches. This is a significant difference and improvement over conventional approaches which typically are required to transfer device and/or customer information over a non-secure network when providing that information to a support entity.

In some embodiments, the system, apparatuses, and methods utilize a physical coding format, such as a barcode or QR (quick response) code displayed on a device screen to enable a customer to initiate a customer service request. The customer may initiate a request (or authenticate themselves after initiating a request) by transferring the code/image to the customer service provider or other form of customer support entity (such as a service acting as a proxy between the customer and the support/service provider).

In some embodiments, the transferred code may include a secure "token" which enables the customer to authenticate themselves and may enable the customer support service to access device or operational contextual information and/or customer identification information stored in a secure data store. In some embodiments, the code/image provided to the customer may contain a "link" or other address format that the customer may use to navigate to a customer service website. In one embodiment, a code and/or token may be included in a URL link; when the link is selected or activated by a customer on a device, the code enables a customer to initiate a customer service request.

In some embodiments, a product may include a tag or label that is capable of transferring information and data to a customer's device (such as a mobile phone) using a wireless communications technology such as near field communications (NFC). The transfer of the information to the customer's device enables the customer to initiate an automated engagement between the customer and a support entity for the purpose of assistance with sales, marketing or device related services (i.e., configuration, troubleshooting, installation, operation, etc.).

As described, in some embodiments, a code (e.g., a barcode or QR code) representing the context of the situation requiring support or assistance (such as an error code, device status, device configuration, etc.) may be dynamically generated by a customer service provider. The code may be based at least in part on information provided by a company (such as the manufacturer or seller of the customer's device) to the service provider. The information provided by a manufacturer or seller of a product may include one or more of a customer's name, a brand of a device, a model of a device, an initial configuration of a device, etc. In some cases, a company that manufactures or sells a device or provides a service may provide this type of information to a customer service provider on a regular basis as part of a sales or warranty process. In other cases, a customer may provide the information to the company or to a customer service provider when registering a device or service.

The generated code is provided by the customer service provider to the company, which then provides the code to the customer (via on screen display or electronic transfer via text or email). The customer then provides the code to a customer service entity (which is typically, although not required to be, the same entity as the one that generated the code). In some cases, the generated code may not contain any device specific information but only a secure token which is used to access previously stored device and customer information (which the company collected when it became aware of a customer's problem, upon sale of a device, or upon registration for a warranty or other service by the customer, and provided to the service provider for storage prior to the code being generated). In one example, a secure token could be installed on a near field communication (NFC) device instead of or in addition to a barcode or QR code. However, note that in the case of an installed token, the token would not be dynamically generated.

The code provided to the customer service entity by the customer (via the intermediary of the company, which provided the code or token to the customer) enables the service entity to retrieve the device context and/or customer identity information from a secure data storage element. This is typically accomplished by introducing or encoding a secure token into the code, with the token being used to access the device and/or customer data from the data storage element. Importantly, this provides security for the device and/or customer data because that data is only accessible by virtue of using the secure token, which cannot be obtained by an unintended or unauthorized party.

In some embodiments, additional security factors may be implemented as part of using the token. These may include one or more of controlling access to the services by (1) if someone has a token, then requiring that additional verification (e.g., use of multi-factor authentication, a password, or phone number, etc.) be provided at the time the customer starts the service request or conversation, or (2) a limited-use token where the token may only be used once, after which the token is invalid. Both of these versions of the token protect against situations where an unauthorized 3$^{rd}$ party might obtain the token. Further, the token may contain a time constraint so that the bootstrap code is only valid for a specific period of time, thereby further limiting the possibility of malicious use of the token.

In some embodiments, the device and/or customer identification information may be registered with (or provided to) a cloud-based service in advance of the customer needing assistance; in this case the cloud service stores and protects the information. The cloud service may generate a URL that may be used by a customer to initiate a customer support interaction/conversation. When a support conversation is started, the context and identification data may be accessed and provided by the cloud service to the customer and/or to the support entity as part of a conversation or interaction.

In some embodiments, the device and/or customer identification information may be generated in response to a device error or problem encountered by a customer and recognized by the device (e.g., a failure to install software, a configuration problem, an operational problem, etc.). The information may be provided to the company by a customer or in some cases automatically by a device, where the company then provides the information to the customer service provider. The service provider generates the code, stores the information securely and provides the code to the company, which provides it to the customer. In this embodiment, the code may contain real-time or pseudo real-time information regarding the status of a device, the error encountered, the operational situation involving the customer, the customer's location, the customer's method of connecting, etc.

As noted, the approach described herein (i.e., the system or solution architecture) enables access and use of real-time or pseudo real-time information regarding the user and/or the context of a service request. As part of this approach, a customer service entity is able to securely maintain the contextual and customer identity information without exposing that information externally as part of the engagement process (e.g., in some embodiments by using a QR code or transferring a token by a NFC capability to limit opportunities for interception or unauthorized access). Thus, embodiments of the system and methods described herein enable the use of contextual and user identification information to provide improved customer service, without exposing that information to unauthorized access and potential misuse.

The following represent examples of how a QR code or other form of bootstrap code placed on, displayed on, or transferred from a device may be used to initiate a customer service engagement, in accordance with some embodiments of the present disclosure:

a. A customer is playing a game on her gaming console. She is facing some issue during the game. She opens the "Help and support section" and discovers a OR code on the console game screen for starting a personalized engagement with a customer support team.
    i. On scanning the QR code, it opens a link on the browser which starts a messaging conversation with the support team.
  b. A customer bought a fitness cycle. He does not know where to start to set up and use the device. On the packaging, he sees a QR code to contact customer support via messaging.
    i. On scanning the QR code, it opens a link inside an application or on the mobile browser (if an app is not installed) which starts a messaging conversation with the support team.
  c. A customer bought a home security kit. The base device is NFC tagged. He does not know where to start assembling the kit.
    i. After holding his phone to the base device, it opens a link inside an application or on the browser (if an app is not installed) which starts a messaging conversation with the support team.

FIG. 1 is a diagram illustrating the primary elements or functions of an example system 100 for providing customer service or support in accordance with an embodiment of the systems, apparatuses, and methods described herein. As show in the figure, in this example, a company 104 (e.g., the manufacturer or seller of a device, product or service) uses a solution provider API 106 (identified as "Service Solution API" in the figure) to provide contextual data and/or user/customer information (identified as "Context" in the figure) to the customer service/solution provider system or platform 114 (where, for example, the solution provider is an entity such as the assignee of the present application). The provided data and/or information is typically relevant to a customer's service request to the solution provider and may include such data or information as the device serial number, device model, the location of the device, the configuration of the device, etc. Note that some or all of the data and/or information may be provided in advance of a customer's need for assistance (such as during a sale or warranty registration process); further, some or all may be provided by a device in response to a problem (such as an error code representing a problem occurring during configuration or operation, and hence in real-tin-le or pseudo real-time) or in response to a service request initiated by a customer. In some embodiments, the solution provider may be an entity (such as the assignee of the present application) that provides customer support services to a company or companies.

The information provided by the company may be stored "in the cloud" (typically in an electronic data storage element or database 108). The information may be stored with a unique identifier that is used to identify the company and/or the customer. The company 104 may have an associated account which is one of several that are maintained and administered as part of a SaaS or multi-tenant platform. The customer support services provided through the SaaS or multi-tenant platform may be provided by the solution provider 114. The solution provider 114 stores the provided information in data store 108 and generates a digitally encoded bootstrap code 110. The code 110 may include a secure token to enable access to the stored information and/or customer identification information and may or may not contain a portion of the actual device or customer information. The service solution API 106 provides the bootstrap code (which may be represented by a QR code or another form, such as a URL) to the company 104, which provides it to the customer 102.

Note that in some examples, the QR code, URL or a secure token may be programmed or embedded in an NFC sticker or chip, or other form of active or passive device. In this situation, when a customer needs support assistance, they may use a mobile phone to photograph the QR code or transfer the data programmed into the NFC chip to their device. This provides the customer with the bootstrap code 110 provided by the company 104. In the case of a programmed NFC chip, the user may use an NFC enabled mobile device to "tap" on the NFC sticker or chip and thereby access the bootstrap code 110. Note that the QR/bootstrap code 110 may be provided to the customer in advance of the customer's need for service (e.g., as part of a device package or instruction manual) and/or displayed on a screen of a customer's device (e.g., television, computer display, tablet, gaming platform, etc.) after the device has generated an error or the customer has encountered a problem and notified the company or service provider.

The bootstrap code 110 that is included in (or forms) the QR code (or other format) is provided by the customer 102 to the customer service/solution provider 114 and operates to initiate an engagement with the solution provider engagement service 112, thereby starting a customer support conversation or other form of interaction. Importantly, when the messaging or customer service engagement is initiated with the solution provider 114 using a secure token that was provided to the customer as part of the QR or other code, the previously provided contextual and/or identification data and information may be retrieved from the data store 108 to enable a more effective interaction between the customer and customer service entity (which may be providing a (chat)bot, person, application, or a combination of these to assist the customer).

As mentioned, company 104 provides the solution API 106 with contextual information (indicated by "Context" in the diagram); this information may include, but is not limited to information regarding the customer, the device (or product or service) being used by the customer, and in some cases the current situation status regarding the device (such as an error code, alert, etc.). Examples of such information may include, but are not limited to or required to include a product ID or serial number, customer name, application name, customer contact information, device status indicator, device error code, device configuration, software, hardware or firmware version currently installed, etc.

The service solution API 106 receives the contextual information from company 104 and in response stores the information in data store 108 and provides a generated bootstrap code 110 to company 104. In some embodiments, bootstrap code 110 is a digital "code" such as a QR code or barcode that encodes information to be used to provide assistance to customer 102. Bootstrap code 110 may include one or more of a security token, customer identity information, and an address (i.e., URL) or "engagement URL" (e.g., a link to a webpage or site that may be used to initiate a communication) that is used to initiate engagement between the customer and a support service.

Bootstrap code 110 may be stored in data store 108 and provided to company 104 (via Service Solution API 106) and to the solution provider's engagement service or function 112 (identified as "Engagement Service" in the figure). Engagement service or function 112 (for example, a web-messaging service or an in-app messaging service) operates to provide a mechanism and communication channel for engaging (or engaging further) with the customer. In some embodiments, the functions of engagement service 112 are initiated or activated using the bootstrap code, and service 112 uses the information encoded into the bootstrap code (i.e., the security token) to securely initiate the engagement and to retrieve any related contextual and/or identification information from data store 108. Company 104 provides the bootstrap code 110 to customer 102, and code 110 is used by the customer to authenticate themselves and confirm their identity with the engagement service 112 and to authorize access to the customer's stored contextual or other information.

In one example embodiment, a customer service engagement may be initiated/triggered without the customer providing the bootstrap code. Instead, a customer service engagement may be "automatically" triggered by the bootstrap code being provided to the engagement service 112 by the solution API 106 or data store 108 after the code is generated in real-time, such as in response to a detected device error. This would allow the engagement service 112 to proactively call or message a customer having a problem and offer assistance. In one example, company 104, could, in the event of an error, use bootstrap code 110 (which it already has for customer 102), and make a call to engagement service 112 (an API endpoint). Engagement service 112 would then provide an engagement service endpoint (e.g., a verified/authenticated web messaging service or in app messaging service) to the customer 102.

The system, apparatuses, and methods described herein provide a secure, dynamic, real-time and contextually relevant process for providing assistance to a customer with regards to a product or service. The described system and methods are able to acquire real-time (or pseudo real-time) status information regarding a device, an error, a problem or a customer request and in response, provide a customer with a secure way to engage and interact with a customer assistance platform (which may include providing access to a human, an application, a website, and/or a (chat)bot). As realized by the inventors, contextual information is important to enabling proactive and automated support services to customers. In the absence of the embodiments described herein, a manufacturer or sales entity is unable to automatically engage with their customers and is less able to provide a unique, effective, and secure customer experience.

Figure 2:
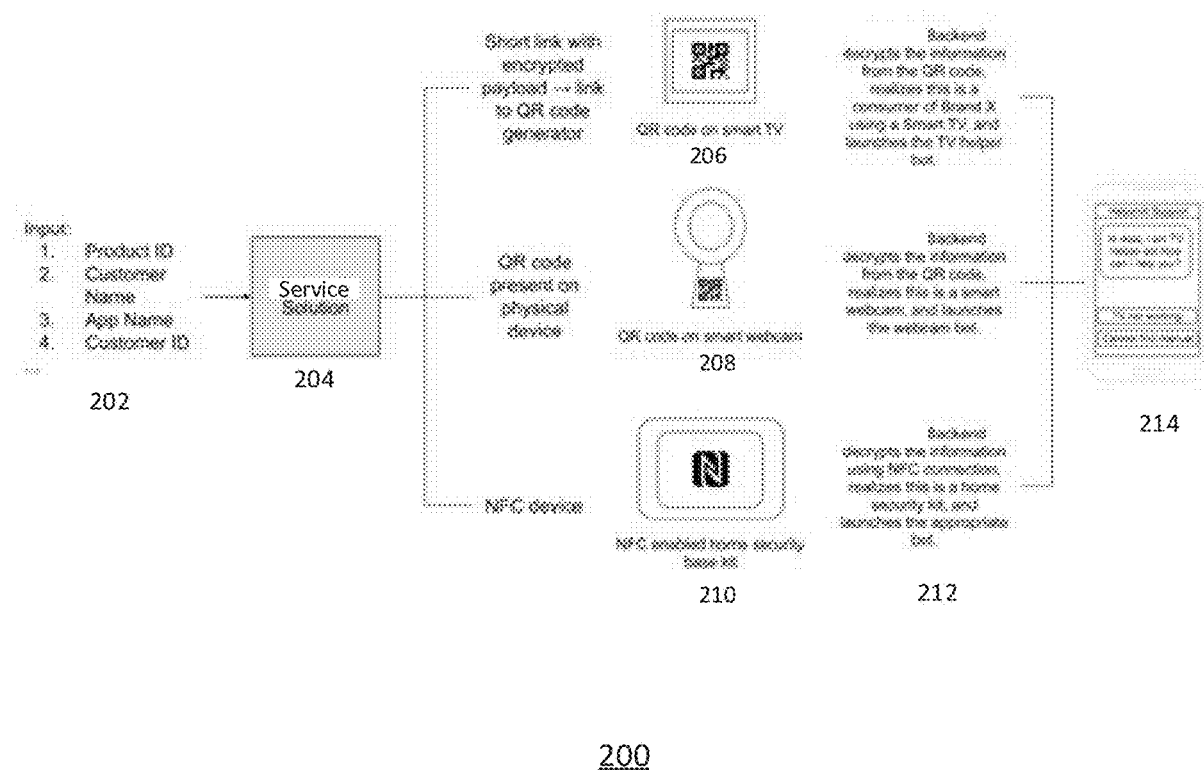
FIG. 2 is a diagram illustrating an overview of a process, method, function or operation for providing customer service or support, in accordance with an embodiment of the systems, apparatuses, and methods described herein.

FIG. 2 is a diagram illustrating an overview of a process, method, function or operation for providing customer service or support 200, in accordance with an embodiment of the systems, apparatuses, and methods described herein. As shown in the figure, input data 202 is provided to the customer service solution provider (identified as "Service Solution" 204 in the figure). This input data 202 may be provided in advance of a customer needing assistance and/or contemporaneously with a need for assistance. Input data 202 may include but is not limited to (or required to include) one or more of a product ID (such as model and/or serial number), a customer name and/or customer ID, customer contact information, product configuration information (such as the version of the hardware, software or firmware), the installed operating system, and an application name or other identifier. The output of the solution 204 is a QR/bootstrap code or other form of encoded representation of the contextual data, along with a secure token that is used by the system to retrieve data and information from a data store.

The generated QR or other form of code (element 110 in FIG. 1) may be presented to a customer in one or more ways; these include display of the code on the customer's device (as suggested by 206), as a code that is included on the customer's device when it is purchased (as suggested by 208), or as a code or display transferred from the customer's device to the customer's mobile phone by a suitable communications mechanism (such as NFC, Bluetooth, etc., as suggested by 210). In the example use cases, the customer service solution provider engagement service (element 112 in FIG. 1) receives the code from the customer, decrypts the QR code, accesses any stored customer or device information from a data store, uses the information to identify the customer and device, and in response provides the appropriate assistance (e.g., via launching of a bot, providing a connection to a person, directing the customer to a website, etc., as suggested by 212). In some cases, the assistance may be provided via a chat bot that generates a messaging display on the customer's mobile phone or similar device (as suggested by 214).

FIG. 3(a) is a diagram illustrating further details of the process, method, function or operation 300 for providing customer service or support of FIG. 2, in accordance with an embodiment of the systems, apparatuses, and methods described herein. As suggested by the figure, data and information regarding a device, service, user, etc. (as suggested by 302) is provided to the customer service solution provider 304, resulting in the ability to access secure information and enable a customer to interact with an appropriate chat bot (306) on their mobile device or utilize another form of assistance. The chat bot or other form of assistance is typically configured and operates in a manner based on one or more of the customer (based on their profile or characteristics), the device requiring customer assistance (based on the type of device, the brand, brand-specific characteristics, the configuration of the device, etc.) and/or the customer's means of accessing the customer service (e.g., a smartphone, tablet, desktop computer, etc.).

FIG. 3(b) is a flowchart or flow diagram illustrating a process, method, function or operation 320 for providing customer service or support, in accordance with an embodiment of the systems, apparatuses, and methods described herein. As examples, a customer's need for customer support may occur as a result of a problem they encounter regarding one or more of installation, registration, activation, operation, configuration, or troubleshooting of a device or application (step or stage 322). In some embodiments, the company that manufactured or sold the device becomes aware of the problem or error as a result of an automatically generated alert or other form of notification (step or stage 324). In other cases, the customer may request assistance via text, email, or a voice communication. In yet other cases, a customer may transfer a previously generated code to the company or directly to a customer service provider. In yet other example cases, a customer may automatically generate an indication of needing assistance by launching a customer service application or navigating to a customer service website.

In the situation in which the company becomes aware of a problem or error in real-time or pseudo real-time with the occurrence of the problem or error, the company may collect certain contextual and/or customer identification data/information (e.g., product serial number, model, error codes, device status, customer name, customer location, etc.) (step or stage 326). In some cases, the company may have access to some or all of this information prior to being made aware of a problem requiring assistance. For example, the company may obtain and store information regarding the customer name, customer location, device brand, device model, etc. as part of a sales process or by the customer registering for customer service or a warranty (step or stage 326).

The company provides the contextual and/or customer identification data/information to the customer service solution provider, typically by using an API to the provider platform (which as noted, may be a multi-tenant or SaaS service platform) (step or stage 328). Some or all of this information may be provided to the customer service solution provider in advance of a problem or error. The solution provider generates a barcode, QR code or other suitable form of code (which may include a secure token to control access to the provided/accessed information) and stores the provided information and code in a secure data store (step or stage 330). The customer service solution provider then transfers a copy of the generated code to the company (step or stage 332). The company transfers the generated code to the customer, via a suitable communication channel (text, email), by causing a display to be generated on the customer's device, or other suitable manner (such as transfer by NFC from a package to a customer's device of a previously created code) (step or stage 334).

In another example, a QR code or similar form of code may be printed on a package or contained in an instruction or user manual. Upon scanning the printed code, a user/customer may be directed to a process to provide them with assistance. As with some of the other examples, in this example the code may be created previously to the user requesting assistance. Further, in examples where a code is provided to the user/customer prior to their need for assistance, the code may be used to retrieve previously obtained and stored information regarding the customer or the device or service they purchased (such as name, contact information, model and serial number of purchased device, installed software version, warranty terms, etc.).

The customer service solution provider also transfers the generated code to the provider's customer engagement system or platform (step or stage 336). The customer uses the generated code to initiate a communication session with the solution provider's customer engagement system or platform (step or stage 338). In response to receiving the generated code from the customer (e.g., via text or email), the engagement system decrypts the received code, verifies the authenticity of the code, and then uses the secure token from the code to access the stored customer and/or device data and information. In response, the engagement system launches or otherwise causes the initiation of a suitable chat bot or other customer assistance service (e.g., text, email, phone call, etc.) (step or stage 340).

Figure 4:
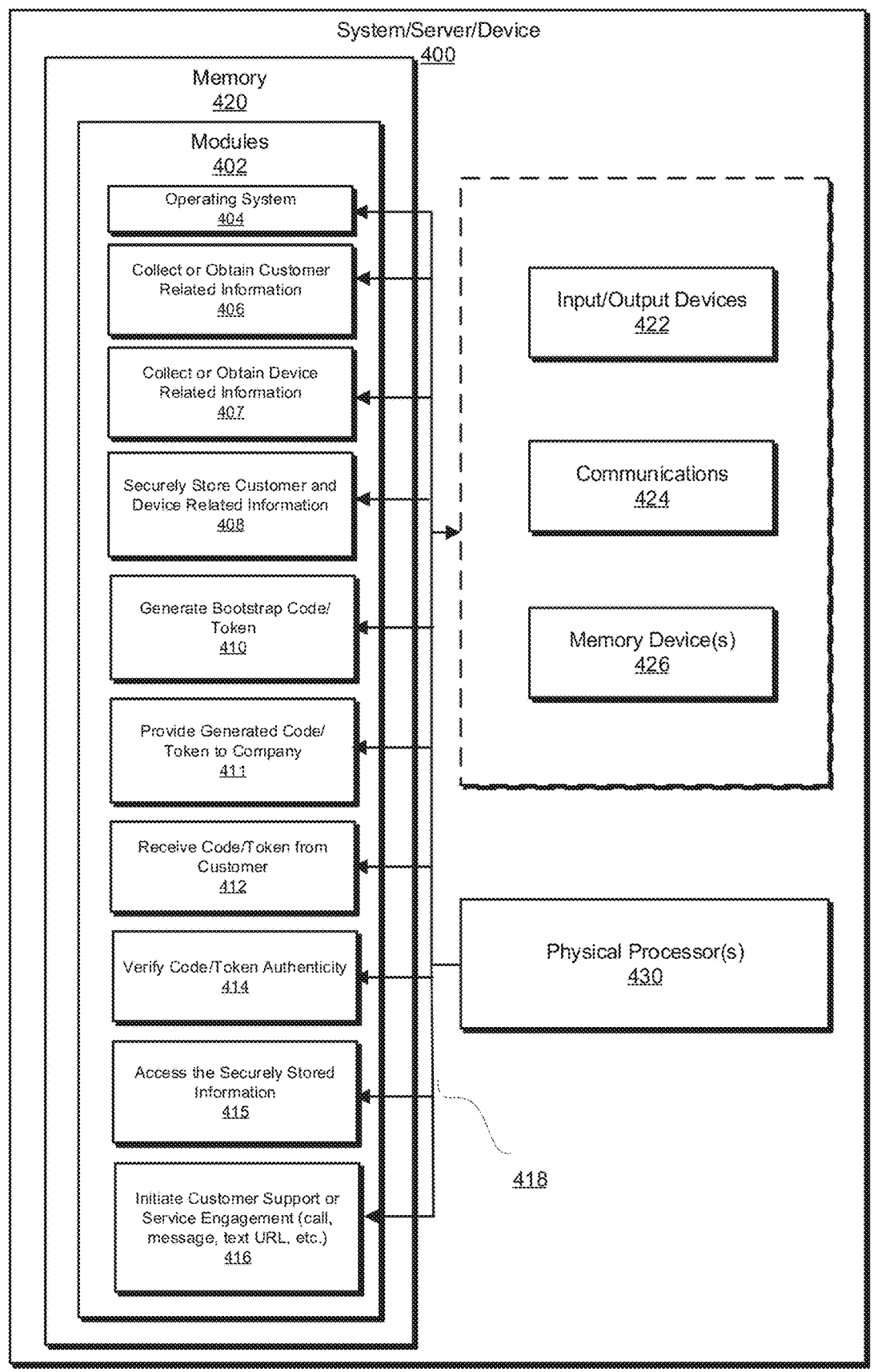
FIG. 4 is a diagram illustrating elements or components that may be present in a computer device or system configured to implement a method, process, function, or operation in accordance with an embodiment of the systems, apparatuses, and methods described herein.

FIG. 4 is a diagram illustrating elements or components that may be present in a computer device or system configured to implement a method, process, function, or operation in accordance with an embodiment of the system and methods described herein. As noted, in some embodiments, the system and methods may be implemented in the form of an apparatus that includes a processing element and set of executable instructions. The executable instructions may be part of a software application and arranged into a software architecture. In general, an embodiment may be implemented using a set of software instructions that are designed to be executed by a suitably programmed processing element (such as a GPU, CPU, microprocessor, processor, controller, computing device, etc.). In a complex application or system such instructions are typically arranged into "modules" with each such module typically performing a specific task, process, function, or operation. The entire set of modules may be controlled or coordinated in their operation by an operating system (OS) or other form of organizational platform.

Each application module or sub-module may correspond to a particular function, method, process, or operation that is implemented by the module or sub-module. Such function, method, process, or operation may include those used to implement one or more aspects of the described system and methods (such as for collecting information and data relevant to a customer and a device, generating a QR or other form of bootstrap code, securely storing records for a set of devices, customers, and/or companies, engaging with a customer and assisting them by providing a type of customer service that will help resolve their problem, maintaining records of communication or customer assistance records for a customer, etc.). In one embodiment, such function, method, process, or operation may include one or more of:

Collection of (or otherwise obtaining) device and/or customer information:
Customer information may include one or more of customer name, address, contact information, place of purchase, date of purchase, customer location, etc.;
Device information may include one or more of device type, device model, device serial number, device configuration (such as operating system, firmware version), current device status (e.g., alert or error code), device method of connecting to customer service entity, or other relevant information regarding the operation, configuration, or condition of the device;
In some cases, this information may be obtained from a company that manufactured the device or sold the device to the customer;
In some cases, this information may be obtained in real-time or pseudo real-time from the device and represented by an error code, alert, or other indicator of a problem or need for customer assistance;
Storage of the collected information and data in a secure manner, and typically associated with a unique identifier;
Generation of a token or code that includes the unique identifier (or an encoded version of it) and may also include other information about the customer or device;
Providing the generated token or code (or other form of identifier) to the customer, either directly from the entity that generated the token or code or from an intermediary entity (such as the manufacturer or seller of the device who obtained the token or code from a customer support or customer service entity that generated the code);
Receiving the token or code from the customer;
verifying the token or code's authenticity;
using the token or code to access the securely stored information and data; and
initiating a customer service or support engagement with the customer;
where the customer support engagement may be initiated by any suitable technique or communications method, including but not limited to email, text, a phone call, chat loot, directing a customer to a URL, a list of FAQs, etc.

The application modules and/or sub-modules 402 may include any suitable computer-executable code or set of instructions (e.g., as would be executed by a suitably programmed processor, microprocessor, or CPU), such as computer-executable code corresponding to a programming language. For example programming language source code may be compiled into computer-executable code. Alternatively, or in addition, the programming language may be an interpreted programming language such as a scripting language.

Modules 402 may contain one or more sets of instructions for performing a method or function described with reference to the Figures, and the descriptions of the functions and operations provided in the specification. These modules may include those illustrated but may also include a greater number or fewer number than those illustrated. As mentioned, each module may contain a set of computer-executable instructions. The set of instructions may be executed by a programmed processor contained in a server, client device, network element, system, platform or other component. A module may contain instructions that are executed by a processor contained in more than one of a server, client device, network element, system, platform or other component. Thus, in some embodiments, a plurality of electronic processors, with each being part of a separate device, server, or system may be responsible for executing all or a portion of the software instructions contained in an illustrated module. Thus, although FIG. 4 illustrates a set of modules which taken together perform multiple functions or operations, these functions or operations may be performed by different devices or system elements with certain of the modules (or instructions contained in those modules) being associated with those devices or system elements.

As shown in FIG. 4, system 400 may represent a server or other form of computing or data processing system, platform or device. Modules 402 each contain a set of executable instructions, where when the set of instructions is executed by a suitable electronic processor or processors (such as that indicated in the figure by "Physical Processor(s) 430"), system (or server, platform, or device) 400 operates to perform a specific process, operation, function or method. Modules 402 are stored in a memory 420, which typically includes an Operating System module 404 that contains instructions used (among other functions) to access and control the execution of the instructions contained in other modules. The modules 402 stored in memory 420 are accessed for purposes of transferring data and executing instructions by use of a "bus" or communications line 418, which also serves to permit processor(s) 430 to communicate with the modules for purposes of accessing and executing a set of instructions. Bus or communications line 418 also permits processor(s) 430 to interact with other elements of system 400, such as input or output devices 422, communications elements 424 for exchanging data and information with devices external to system 400, and additional memory devices 426.

Figure 3:
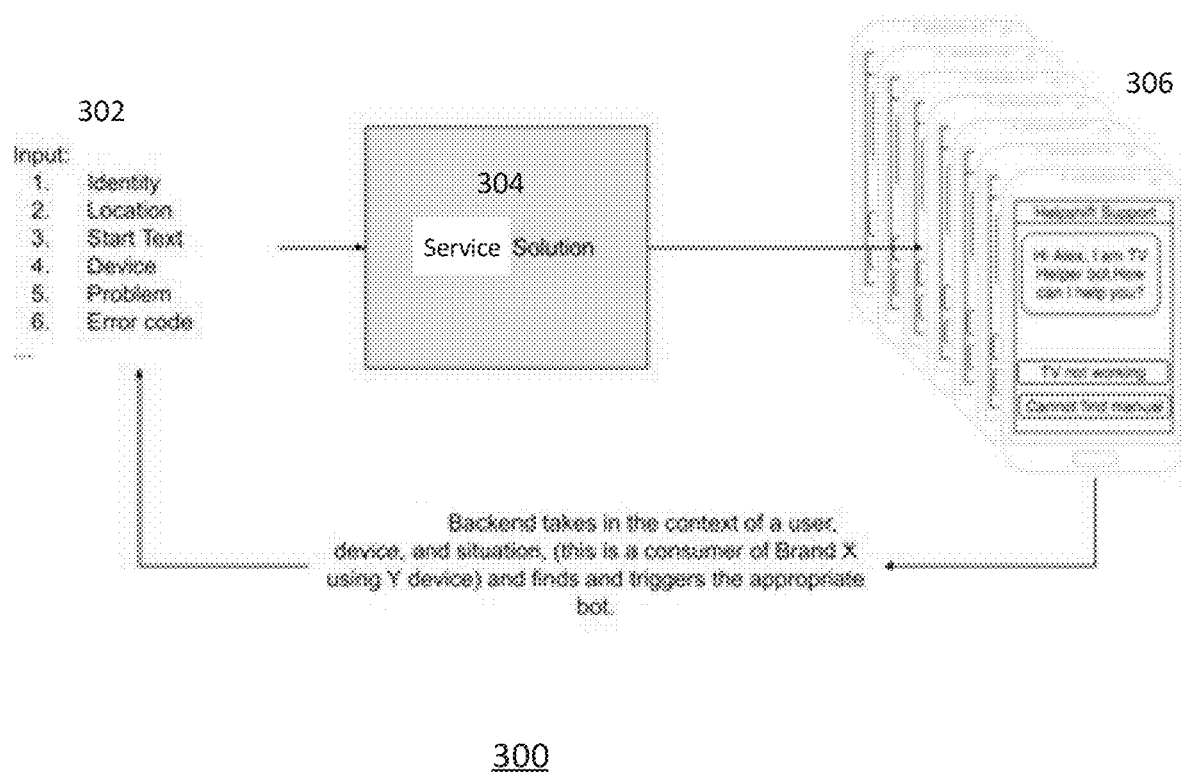
FIG. 3(a) is a diagram illustrating further details of the process, method, function or operation for providing customer service or support of FIG. 2, in accordance with an embodiment of the systems, apparatuses, and methods described herein.
FIG. 3(b) is a flowchart or flow diagram illustrating a process, method, function or operation for providing customer service or support, in accordance with an embodiment of the systems, apparatuses, and methods described herein.
Figure 3:
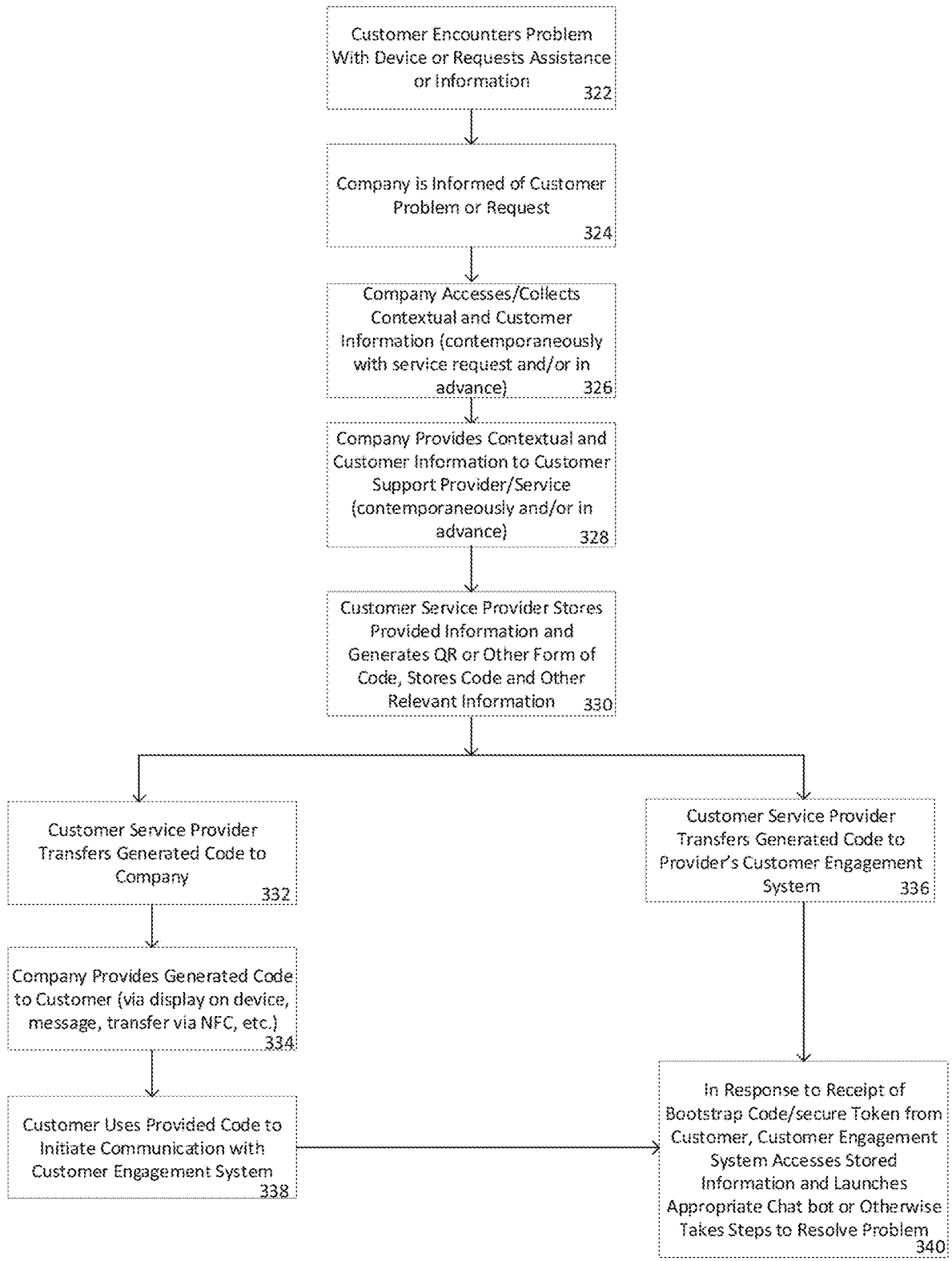

For example, Collect or Obtain Customer Related Information Module 406 may contain instructions that when executed by a suitably programmed electronic processor implement a process or function to perform one or more of the data processing operations described with reference to step or stage 326 of FIG. 3(*b*). Collect or Obtain Device Related Information Module 407 may contain instructions that when executed by a suitably programmed electronic processor implement a process or function to perform one or more of the data processing operations described with reference to step or stage 326 of FIG. 3(*b*). Securely Store Customer and Device Related Information Module 408 may contain instructions that when executed by a suitably programmed electronic processor implement a process or function to perform one or more of the data processing operations described with reference to step or stage 330 of FIG. 3(*b*). Generate Bootstrap Code/Token Module 410 may contain instructions that when executed by a suitably programmed electronic processor implement a process or function to perform one or more of the data processing operations described with reference to step or stage 330 of FIG. 3(*b*). Provide Generated Code/Token to Company Module 411 may contain instructions that when executed by a suitably programmed electronic processor implement a process or function to perform one or more of the data processing operations described with reference to step or stage 332 of FIG. 3(*b*). Receive Code/Token from Customer Module 412 may contain instructions that when executed by a suitably programmed electronic processor implement a process or function to perform one or more of the data processing operations described with reference to step or stage 338 and/or step or stage 340 of FIG. 3(*b*). Verify Code/Token Authenticity Module 414 may contain instructions that when executed by a suitably programmed electronic processor implement a process or function to perform one or more of the data processing operations described with reference to step or stage 340 of FIG. 3(*b*). Access the Securely Stored Information Module 415 may contain instructions that when executed by a suitably programmed electronic processor implement a process or function to perform one or more of the data processing operations described with reference to step or stage 340 of FIG. 3(*b*). Initiate Customer Support or Service Engagement Module 416 may contain instructions that when executed by a suitably programmed electronic processor implement a process or function to perform one or more of the data processing operations described with reference to step or stage 340 of FIG. 3(*h*).

Figure 5:
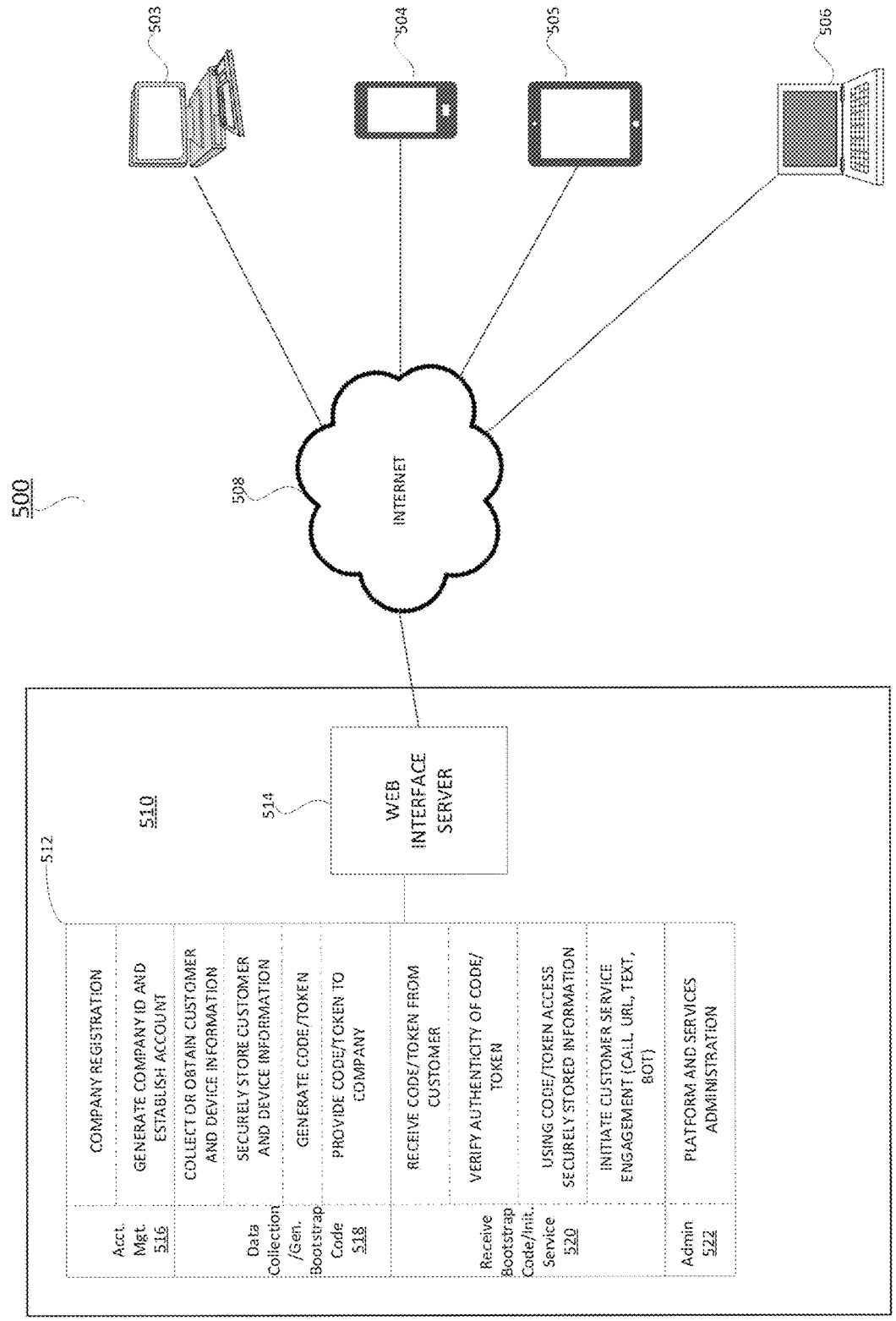
FIGS. 5-7 are diagrams illustrating an architecture for a multi-tenant or SaaS platform that may be used in implementing an embodiment of the system, apparatuses, and methods described herein.
Figure 6:
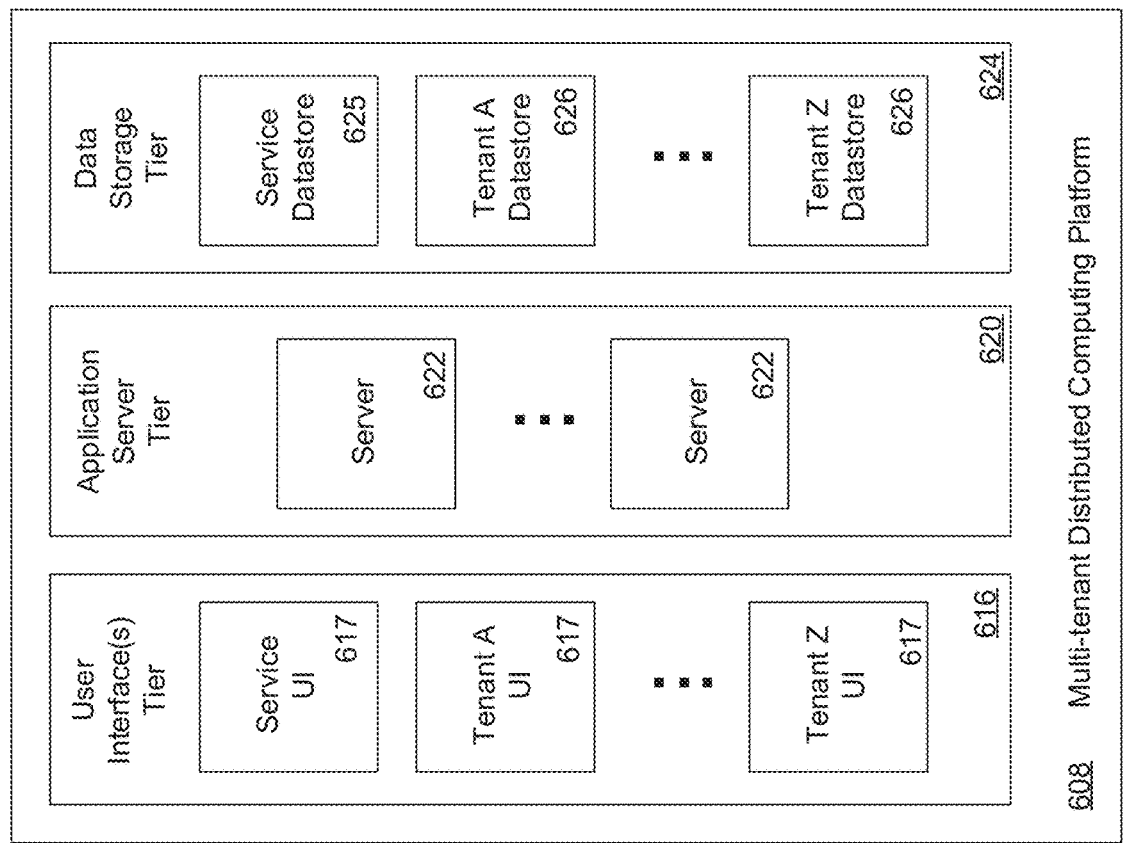
Figure 7:
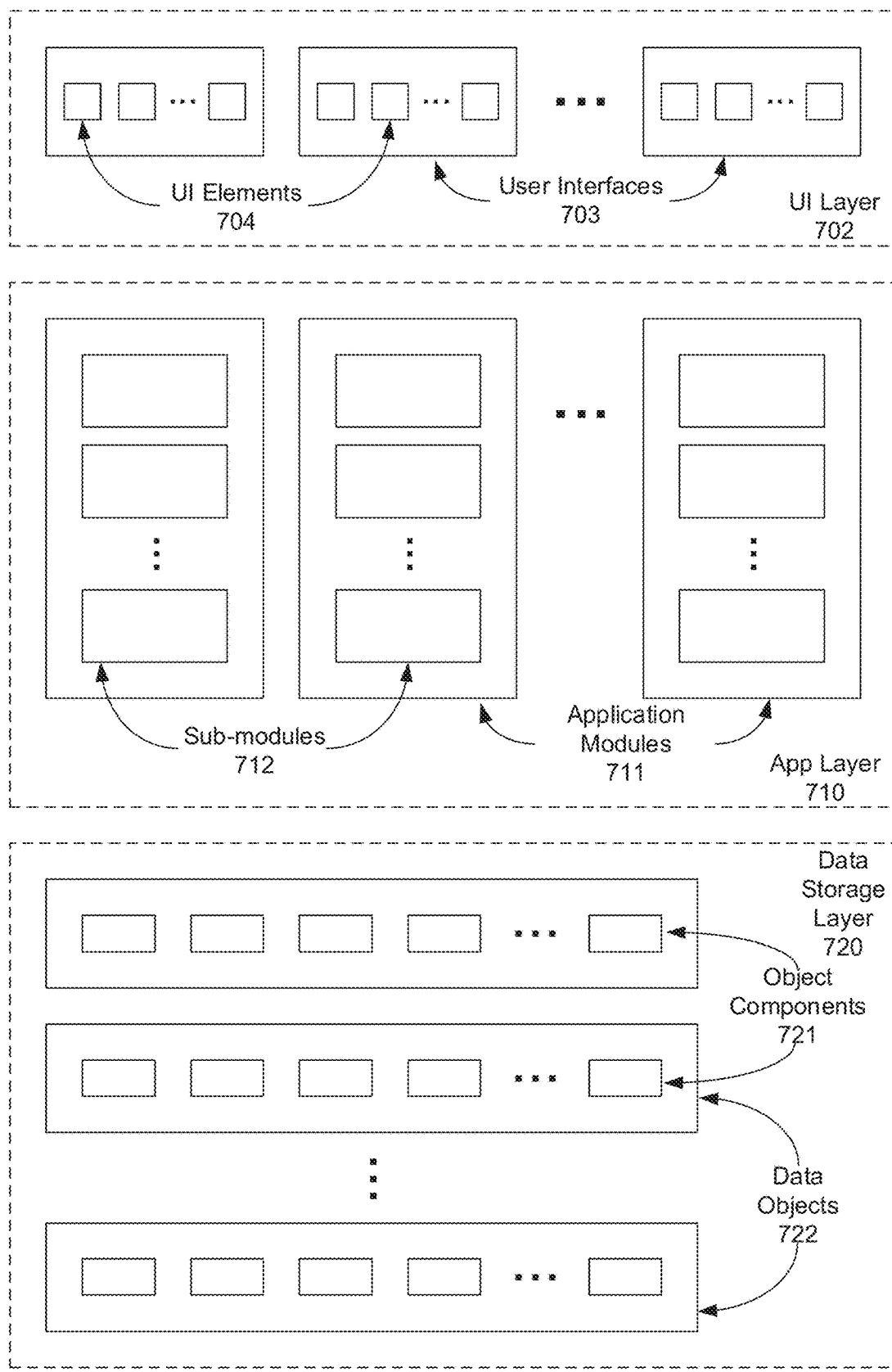

In some embodiments, the functionality and services provided by the system and methods described herein may be made available to multiple companies or users, with each company or user having an account maintained by a server or server platform. Such a server or server platform may be termed a form of Software-as-a-Service (SaaS). FIG. 5 is a diagram illustrating a SaaS system, including an integrated business system and an enterprise network in which an embodiment of the disclosure may be implemented. FIG. 6 is a diagram illustrating elements or components of an example operating environment in which an embodiment of the disclosure may be implemented. FIG. 7 is a diagram illustrating additional details of the elements or components of the multi-tenant distributed computing service platform of FIG. 6, in which an embodiment of the disclosure may be implemented.

In some embodiments, the system or service(s) described herein may be implemented as micro-services, processes, workflows or functions performed in response to the submission of a message or service request. The micro-services, processes, workflows or functions may be performed by a server, data processing element, platform, or system. In some embodiments, the services may be provided by a service platform located "in the cloud". In such embodiments the platform is accessible through APIs and SDKs. The described customer support services may be provided as micro-services within the platform for each of multiple users or companies, with each of those companies having an account on the platform and a separate secure data storage area. The interfaces to the micro-services may be defined by REST and GraphQL endpoints. An administrative console may allow users or an administrator to securely access the underlying request and response data, manage accounts and access, and in some cases, modify the processing workflow or configuration.

FIG. 5 is a diagram illustrating a system 500 in which an embodiment of the disclosure may be implemented or through which an embodiment of the services described herein may be accessed. In accordance with the advantages of an application service provider (ASP) hosted business service system (such as a multi-tenant data processing platform), users of the services described herein may comprise individuals, businesses, stores, organizations, etc. A user may access the services using any suitable client, including but not limited to desktop computers, laptop computers, tablet computers, scanners, smartphones, etc. In general, any client device having access to the Internet may be used to provide a request or text message requesting customer support services and to receive and display an intent tree model. Users interface with the service platform across the Internet 508 or another suitable communications network or combination of networks. Examples of suitable client devices include desktop computers 503, smartphones 504, tablet computers 505, or laptop computers 506.

Customer Support system 510, which may be hosted by a third party, may include a set of Customer Support services 512 and a web interface server 514, coupled as shown in FIG. 5. It should be appreciated that either or both of the request and message processing services 512 and the web interface server 514 may be implemented on one or more different hardware systems and components, even though represented as singular units in FIG. 5. Services 512 may include means for providing one or more of the customer support functions or operations described with reference to FIG. 1, 2, 3(*a*), 3(*b*), or 4.

In some embodiments, the set of applications available to a company or user may include one or more that perform the functions and methods described herein for collecting information regarding a customer and/or device, storing the collected information, generating a bootstrap code or token that can be provided to a customer (either directly or via the intermediary of a company, such as a device manufacturer or seller), receiving the code or token from the customer, verifying the code or token, accessing the securely stored information, and based on the information, providing the customer with contextually relevant customer assistance (such as direction to a website, chat hot application or other source of assistance for their specific problem). As discussed, these functions or processing workflows may be used to provide a customer with a more efficient and effective response to their inquiry or request for customer support.

As examples, in some embodiments, the set of customer support applications, functions, operations or services made available through the platform or system 510 may include:

Account management services 516, such as
- a process or service to enable a company to register for customer support services for its customers with a customer service provider (such as the assignee of the present application);
- a process or service to generate a company identification and establish an account for the company, the account typically being associated with a secure storage capacity; and
- other forms of account management services.

Data collection and bootstrap code generation processes or services 518, such as
- a process or service to collect, request, access or otherwise obtain information (or other data) related to a customer or customers that may be useful in providing customer support services;
  - the information or other data may be collected or obtained in advance of a request for customer support or assistance (such as from a company that sold a device to a customer) or contemporaneously with a request;
  - the information or other data may include (but is not limited to or required to include) customer name, customer location, place at which a device was purchased, warranty eligibility, customer contact information, etc.;
- a process or service to collect, request, access or otherwise obtain information (or other data) related to a device or service that is the subject of a request for assistance from a customer;
  - the information or other data is typically collected or obtained contemporaneously with a request, but some may be collected in advance;
  - the information or other data may include (but is not limited to or required to include) device type, device model, device serial number, device configuration, installed software or firmware version, operating system, error code, alert, etc.;
- a process or service for securely storing the collected or obtained customer and device information and data;
- a process or service to generate a bootstrap code, token or other form of code that includes and/or can be used to access the securely stored information and data;
- a process or service to provide the generated bootstrap code, token or other form of code to a company when a customer of the company indicates a need for, or requests assistance;

Receiving Code from Customer and Initiating Support Service processes or services 520, such as
- a process or service to receive a generated bootstrap code, token or other form of code from a customer of a company who is seeking assistance;
- a process or service to verify that the received bootstrap code, token or other form of code is a valid one (such as by decrypting or decoding data in the code, etc.);
- a process or service to use the received code to access the securely stored customer and device information and data relevant to that customer and device or service;
- a process or service to, based on the accessed customer and device information and data, determine an appropriate form of customer assistance and initiate that for the customer;
  - where the form of customer assistance may be one or more of a phone call, a text message, an email, directing the customer to a URL or website, initiating a conversation with a chat bat, etc.

administrative services 522, such as
- a process or services to enable the provider of the customer support services and/or the platform to administer and configure the processes and services provided to customers.

The platform or system shown in FIG. 5 may be hosted on a distributed computing system made up of at least one, but likely multiple, "servers." A server is a physical computer dedicated to providing data storage and an execution environment for one or more software applications or services intended to serve the needs of the users of other computers that are in data communication with the server, for instance via a public network such as the Internet. The server, and the services it provides, may be referred to as the "host" and the remote computers, and the software applications running on the remote computers being served may be referred to as "clients." Depending on the computing services) that a server offers it could be referred to as a database server, data storage server, file server, mail server, print server, web server, etc. A web server is a most often a combination of hardware and the software that helps deliver content, commonly by hosting a website, to client web browsers that access the web server via the Internet.

FIG. 6 is a diagram illustrating elements or components of an example operating environment 600 in which an embodiment of the disclosure may be implemented. As shown, a variety of clients 602 incorporating and/or incorporated into a variety of computing devices may communicate with a multi-tenant service platform 608 through one or more networks 614. For example, a client may incorporate and/or be incorporated into a client application (e.g., software) implemented at least in part by one or more of the computing devices. Examples of suitable computing devices include personal computers, server computers 604, desktop computers 606, laptop computers 607, notebook computers, tablet computers or personal digital assistants (PDAs) 610, smart phones 612, cell phones, and consumer electronic devices incorporating one or more computing device components, such as one or more electronic processors, microprocessors, central processing units (CPU), or controllers. Examples of suitable networks 614 include networks utilizing wired and/or wireless communication technologies and networks operating in accordance with any suitable networking and/or communication protocol (e.g., the Internet).

The distributed computing service/platform (which may also be referred to as a multi-tenant data processing platform) 608 may include multiple processing tiers, including a user interface tier 616, an application server tier 620, and a data storage tier 624. The user interface tier 616 may maintain multiple user interfaces 617, including graphical user interfaces and/or web-based interfaces. The user interfaces may include a default user interface for the service to provide access to applications and data for a user or "tenant" of the service (depicted as "Service UI" in the figure), as well as one or more user interfaces that have been specialized/customized in accordance with user specific requirements (e.g., represented by "Tenant A UI", ..., "Tenant Z UI" in the figure, and which may be accessed via one or more APIs).

The default user interface may include user interface components enabling a tenant to administer the tenant's access to and use of the functions and capabilities provided by the service platform. This may include accessing tenant data, launching an instantiation of a specific application, causing the execution of specific data processing operations, etc. Each application server or processing tier 622 shown in the figure may be implemented with a set of computers and/or components including computer servers and processors, and may perform various functions, methods, processes, or operations as determined by the execution of a software application or set of instructions. The data storage tier 624 may include one or more data stores, which may include a Service Data store 625 and one or more Tenant Data stores 626. Data stores may be implemented with any suitable data storage technology, including structured query language (SQL) based relational database management systems (RDBMS).

Service Platform 608 may be multi-tenant and may be operated by an entity in order to provide multiple tenants with a set of business-related or other data processing applications, data storage, and functionality. For example, the applications and functionality may include providing web-based access to the functionality used by a business to provide services to end-users, thereby allowing a user with a browser and an Internet or intranet connection to view, enter, process, or modify certain types of information. Such functions or applications are typically implemented by one or more modules of software code/instructions that are maintained on and executed by one or more servers 622 that are part of the platform's Application Server Tier 620. As noted with regards to FIG. 5, the platform system shown in FIG. 6 may be hosted on a distributed computing system made up of at least one, but typically multiple, "servers."

As mentioned, rather than build and maintain such a platform or system themselves, a business may utilize systems provided by a third party. A third party may implement a business system/platform as described above in the context of a multi-tenant platform, where individual instantiations of a business' data processing workflow (such as the message/request processing and routing described herein) are provided to users, with each company/business representing a tenant of the platform. One advantage to such mufti-tenant platforms is the ability for each tenant to customize their instantiation of the data processing workflow to that tenant's specific business needs or operational methods. Each tenant may be a business or entity that uses the multi-tenant platform to provide business services and functionality to multiple users.

FIG. 7 is a diagram illustrating additional details of the elements or components of the multi-tenant distributed computing service platform of FIG. 6, in which an embodiment of the disclosure may be implemented. The software architecture shown in FIG. 7 represents an example of an architecture which may be used to implement an embodiment of the disclosure. In general, an embodiment may be implemented using a set of software instructions that are designed to be executed by a suitably programmed processing element (such as a CPU, microprocessor, processor, controller, computing device, etc.). In a complex system such instructions are typically arranged into "modules" with each such module performing a specific task, process, function, or operation. The entire set of modules may be controlled or coordinated in their operation by an operating system (OS) or other form of organizational platform.

As noted, FIG. 7 is a diagram illustrating additional details of the elements or components 700 of a multi-tenant distributed computing service platform, in which an embodiment may be implemented. The example architecture includes a user interface layer or tier 702 having one or more user interfaces 703. Examples of such user interfaces include graphical user interfaces and application programming interfaces (APIs). Each user interface may include one or more interface elements 704. For example, users may interact with interface elements in order to access functionality and/or data provided by application and/or data storage layers of the example architecture. Examples of graphical user interface elements include buttons, menus, checkboxes, drop-down lists, scrollbars, sliders, spinners, text boxes, icons, labels, progress bars, status bars, toolbars, windows, hyperlinks and dialog boxes. Application programming interfaces may be local or remote and may include interface elements such as parameterized procedure calls, programmatic objects and messaging protocols.

The application layer 710 may include one or more application modules 711, each having one or more sub-modules 712. Each application module 711 or sub-module 712 may correspond to a function, method, process, or operation that is implemented by the module or sub-module (e.g., a function or process related to providing business related data processing and services to a user of the platform). Such function, method, process, or operation may include those used to implement one or more aspects of the inventive system and methods, such as for one or more of the processes or functions described with reference to FIGS. 1, 2, 3, and 5:

- Collection of (or otherwise obtaining) device and/or customer information:
  - Customer information may include one or more of customer name, address, contact information, place of purchase, date of purchase, customer location, etc.;
  - Device information may include one or more of device type, device model, device serial number, device configuration (such as operating system, firmware version), current device status (e.g., alert or error code), device method of connecting to customer service entity, or other relevant information regarding the operation, configuration, or condition of the device;
    - In some cases, this information may be obtained from a company that manufactured the device or sold the device to the customer;
    - In some cases, this information may be obtained in real-time or pseudo real-time from the device and represented by an error code, alert, or other indicator of a problem or need for customer assistance;
- Storage of the collected information and data in a secure manner, and typically associated with a unique identifier;
- Generation of a token or code that includes the unique identifier (or an encoded version of it) and may also include other information about the customer or device;
- Providing the generated token or code (or other form of identifier) to the customer, either directly from the entity that generated the token or code or from an intermediary entity (such as the manufacturer or seller of the device who obtained the token or code from a customer support or customer service entity that generated the code);

Receiving the token or code from the customer;
  verifying the token or code's authenticity;
  using the token or code to access the securely stored information and data; and
  initiating a customer service or support engagement with the customer;
    where the customer support engagement may be initiated by any suitable technique or communications method, including but not limited to email, text, a phone call chat bot, directing a customer to a URL, a list of FAQs, etc.

The application modules and/or sub-modules may include any suitable computer-executable code or set of instructions (e.g., as would be executed by a suitably programmed processor, microprocessor, or CPU), such as computer-executable code corresponding to a programming language. For example, programming language source code may be compiled into computer-executable code. Alternatively, or in addition, the programming language may be an interpreted programming language such as a scripting language. Each application server (e.g., as represented by element 622 of FIG. 6) may include each application module. Alternatively, different application servers may include different sets of application modules. Such sets may be disjoint or overlapping.

The data storage layer 720 may include one or more data objects 722 each having one or more data object components 721, such as attributes and/or behaviors. For example, the data objects may correspond to tables of a relational database, and the data object components may correspond to columns or fields of such tables. Alternatively, or in addition, the data objects may correspond to data records having fields and associated services. Alternatively, or in addition, the data objects may correspond to persistent instances of programmatic data objects, such as structures and classes. Each data store in the data storage layer may include each data object. Alternatively, different data stores may include different sets of data objects. Such sets may be disjoint or overlapping.

Note that the example computing environments depicted in FIGS. 5-7 are not intended to be limiting examples. Further environments in which an embodiment of the disclosure may be implemented in whole or in part include devices (including mobile devices), software applications, systems, apparatuses, networks, SaaS platforms, IaaS (infrastructure-as-a-service) platforms, or other configurable components that may be used by multiple users for data entry, data processing, application execution, or data review.

As described, the information used by embodiments to assist in providing contextual customer support services may include both customer specific and device specific information. In some cases, a portion or all of the customer specific information may be provided in advance of the customer requesting or indicating a need for assistance. For example, a company that sells devices or provides services may send the entity that provides the customer support services a file that contains the names and contact information for customers who make a purchase. The file may include a description of what was purchased and identifying information for the device or services purchased. This allows the customer support entity to maintain a relatively up to date database of customers who might potentially require assistance. The information provided at the time of needing assistance may be in the nature of information or data that can be used to better determine the context in which the request for assistance is occurring, such as a device error code, customer location, currently installed operating system or software/firmware version, etc.

In some embodiments, certain of the methods, models or functions described herein may be embodied in the form of a trained neural network, where the network is implemented by the execution of a set of computer-executable instructions or representation of a data structure. The instructions may be stored in (or on) a non-transitory computer-readable medium and executed by a programmed processor or processing element. A trained neural network, trained machine learning model, or other form of decision or classification process may be used to implement one or more of the methods, functions, processes or operations described herein. Note that a neural network or deep learning model may be characterized in the form of a data structure in which are stored data representing a set of layers containing nodes, and connections between nodes in different layers are created (or formed) that operate on an input to provide a decision or value as an output.

In general terms, a neural network may be viewed as a system of interconnected artificial "neurons" that exchange messages between each other. The connections have numeric weights that are "tuned" during a training process, so that a properly trained network will respond correctly when presented with an image or pattern to recognize (for example). In this characterization, the network consists of multiple layers of feature-detecting "neurons"; each layer has neurons that respond to different combinations of inputs from the previous layers. Training of a network is performed using a "labeled" dataset of inputs in a wide assortment of representative input patterns that are associated with their intended output response. Training uses general-purpose methods to iteratively determine the weights for intermediate and final feature neurons. In terms of a computational model, each neuron calculates the dot product of inputs and weights, adds the bias, and applies a non-linear trigger or activation function (for example, using a sigmoid response function).

Machine learning (ML) is being used more and more to enable the analysis of data and assist in making decisions in multiple industries. In order to benefit from using machine learning, a machine learning algorithm is applied to a set of training data and labels to generate a "model" which represents what the application of the algorithm has "learned" from the training data. Each element (or example, in the form of one or more parameters, variables, characteristics or "features") of the set of training data is associated with a label or annotation that defines how the element should be classified by the trained model. A machine learning model is a set of layers of connected neurons that operate to make a decision (such as a classification) regarding a sample of input data. When trained (i.e., the weights connecting neurons have converged and become stable or within an acceptable amount of variation), the model will operate on a new element of input data to generate the correct label or classification as an output.

For example, in some embodiments, a model may be trained to operate to receive as an input a user's service request and the context in which that request is made (such as the generated error messages, alerts, time of day, state of system, previous user interactions with customer service assistance, etc.). In response, the model may generate an output representing the most likely source of the problem or the most helpful way of assisting the customer. Note that once trained, the model can automatically "predict" or generate the probability or confidence level in one or more outputs representing the best "solution" to the customer's problem. Since the system is capturing contextual information associated with a service request, this information is available for use in training/learning about the customer, the problem encountered, and how best to provide assistance to the same or to a different customer.

For example, in supporting a user of a console game, an error-code may be provided as part of the context to indicate that the player is unable to login, along with the identity of the player. A trained model can use this contextual information to determine that the player's account has been locked and respond with specific actions needed by the player to unlock their account. As another example, in supporting a physical device (such as an IoT security camera), the contextual information may be a form of identifying the specific device. Once identified, the model can collect additional contextual data such as remote diagnostic logs, to better identify the most probable problem and respond with the best solution.

In some customer support or assistance systems, a user's intent or purpose in contacting customer service may be used to assist in routing or responding to a service request. A trained machine learning model may be used to assist in determining that intent. For an existing model being used to ascertain a user's intent, the model's operation and accuracy could be improved by using the contextual information described herein. This may permit the "discovery" of insights into the engagement service that indicate the primary areas or issues for which customers are contacting the company. Further, an "intelligent" service can be constructed which, based on context, may operate to route a service request to either a chatbot or to a human, and/or route a request to one of several queues set up in the engagement service based on the context (e.g., a request for an order return need not be picked up by an agent tasked with assisting with technical issues).

The disclosure includes the following clauses and embodiments:

Clause 1. A method for providing a customer of a company with customer service assistance, comprising:
  collecting a set of information related to the customer;
  collecting a set of information related to a current state of a device or service;
  generating a code or token that may be used to access the set of information related to the customer and the set of information related to the current state of the device or service;
  providing the generated code or token to the company;
  receiving the generated code or token from the customer;
  verifying the authenticity of the received code or token;
  if the code or token is verified as authentic, then using the code or token to access the set of information related to the customer and the set of information related to the current state of the device or service; and
  based on the accessed information, providing the customer with the customer service assistance.

Clause 2. The method of clause 1, wherein the information related to the customer comprises one or more of a customer name, customer contact information customer location, and a place of purchase of the device or service.

Clause 3. The method of clause 1, wherein the information related to the current state of the device or service comprises one or more of a device type, model, serial number, firmware version, software version, status, configuration, error code, and an indication of an operational or configuration problem.

Clause 4. The method of clause 1, wherein the method further comprises storing the collected information related to one or both of the customer and the current state of the device or service in a secure data storage element.

Clause 5. The method of clause 1, wherein the code or token is received from the customer in one or more of a text, an image, an email, or as data provided to a website.

Clause 6. The method of clause 1, wherein providing the customer with the customer service assistance further comprises one of sending a text message or email to the customer, calling the customer, directing the customer to a website, or initiating a bot to converse with the customer.

Clause 7. The method of clause 1 further comprising presenting the code or token to the customer as an image on the device, as part of a text or message, or as data contained in a component configured to transfer that data to the customer.

Clause 8. The method of clause 1, wherein at least some of the information related to the customer or the information related to the current state of the device or service is collected in advance of the customer needing the assistance.

Clause 9. The method of clause 1, wherein at least some of the information related to the customer or the information related to the current state of the device or service is collected substantially contemporaneously with the customer needing the assistance.

Clause 10. A system for providing assistance to a customer of a company, comprising:
  one or more electronic processors configured to execute a set of computer-executable instructions;
  one or more non-transitory electronic data storage media containing the set of computer-executable instructions, wherein when executed, the instructions cause the one or more electronic processors to
    collect a set of information related to the customer;
    collect a set of information related to a current state of a device or service;
    generate a code or token that may be used to access the set of information related to the customer and the set of information related to the current state of the device or service;
    provide the generated code or token to the company;
    receive the generated code or token from the customer;
    verify the authenticity of the received code or token;
    if the code or token is verified as authentic, then use the code or token to access the set of information related to the customer and the set of information related to the current state of the device or service; and
    based on the accessed information, provide the customer with the customer service assistance.

Clause 11. The system of clause 10, wherein the instructions cause the one or more electronic processors to present the code or token to the customer as an image on the device, as part of a text or message, or as data contained in a component configured to transfer that data to the customer.

Clause 12. The system of clause 10, wherein the information related to the customer comprises one or more of a customer name, customer contact information, customer location, and a place of purchase of the device or service.

Clause 13. The system of clause 10, wherein the information related to the current state of the device or service comprises one or more of a device type, model, serial number, firmware version, software version, status, configuration, error code, and an indication of an operational or configuration problem.

Clause 14. The system of clause 10, wherein the code or token is received from the customer in one or more of a text, an image, an email, or as data provided to a website.

Clause 15. The system of clause 10, wherein providing the customer with the customer service assistance further comprises one of sending a text message or email to the customer, calling the customer, directing the customer to a website, or initiating a bot to converse with the customer.

Clause 16. The system of clause 10, wherein prior to collecting the set of information related to the current state of the device or service, the company receives an indication of a need for assistance from the customer, the device or the service.

Clause 17. The system of clause 10, wherein at least some of the information related to the customer or the information related to the current state of the device or service is collected substantially contemporaneously with the customer needing the assistance.

Clause 18. One or more non-transitory computer-readable media comprising a set of computer-executable instructions that when executed by one or more programmed electronic processors, cause the processors to provide assistance to a customer of a company by:

collecting a set of information related to the customer;

collecting a set of information related to a current state of a device or service;

generating a code or token that may be used to access the set of information related to the customer and the set of information related to the current state of the device or service;

providing the generated code or token to the company;

receiving the generated code or token from the customer;

verifying the authenticity of the received code or token;

if the code or token is verified as authentic, then using the code or token to access the set of information related to the customer and the set of information related to the current state of the device or service; and based on the accessed information, providing the customer with the customer service assistance.

Clause 19. The one or more non-transitory computer-readable media of clause 18, wherein at least some of the information related to the customer or the information related to the current state of the device or service is collected substantially contemporaneously with the customer needing the assistance.

Clause 20. The one or more non-transitory computer-readable media of clause 18, further comprising instructions that cause the processors to present the code or token to the customer as an image on the device, as part of a text or message, or as data contained in a device configured to transfer that data to the customer.

Clause 21. The one or more non-transitory computer-readable media of clause 18, wherein the instructions further cause the processors to collect the set of information related to the current state of the device or service in response to receiving an indication of a need for assistance from the customer, the device, or the service.

Clause 22. The one or more non-transitory computer-readable media of clause 18, wherein the instructions further cause the processors to store the collected information related to one or both of the customer and the current state of the device or service in a secure data storage.

Clause 23. The one or more non-transitory computer-readable media of clause 18, wherein the information related to the customer comprises one or more of a customer name, customer contact information, customer location, and a place of purchase of the device or service.

Clause 24. The one or more non-transitory computer-readable media of clause 18, wherein the information related to the current state of the device or service comprises one or more of a device type, model, serial number, firmware version, software version, status, configuration, error code, and an indication of an operational or configuration problem.

Clause 25. The one or more non-transitory computer-readable media of clause 18, wherein providing the customer with the customer service assistance further comprises one of sending a text message or email to the customer, calling the customer, directing the customer to a website, or initiating a bot to converse with the customer.

Clause 26. The method of clause 1, further comprising collecting the set of information related to the current state of the device or service in response to receiving an indication of a need for assistance from the customer, the device, or the service.

Clause 27. The system of clause 10, wherein the instructions further cause the processors to store the collected information related to one or both of the customer and the current state of the device or service in a secure data storage.

Clause 28. The system of clause 10, wherein at least some of the information related to the customer or the information related to the current state of the device or service is collected in advance of the customer needing the assistance.

Clause 29. The method of clause 2, wherein the provided customer service assistance is dependent, at least in part, upon the collected set of information related to the customer.

Clause 30. The method of clause 3, wherein the provided customer service assistance is dependent, at least in part, upon the collected set of information related to the current state of the device or service.

Clause 31. The method of clause 30, wherein the provided customer service assistance is determined by inputting at least part of the collected set of information related to the current state of the device or service into a trained model.

Clause 32. The method of clause 31, wherein the trained model is a machine learning model.

Clause 33. The method of clause 32, wherein the trained machine learning model operates to respond to an input of an error code or an indication of an operational or configuration problem by producing a possible source of the code or problem.

Clause 34. The method of clause 32, wherein the trained machine learning model operates to respond to an input of an error code or an indication of an operational or configuration problem by producing a possible solution to the code or problem.

Clause 35. The method of clause 1, wherein the provided customer service assistance is dependent, at least in part, upon the collected set of information related to the customer and the collected set of information related to the current state of the device or service.

Clause 36. The method of clause 35, wherein the provided customer service assistance is determined by a rule-set that maps an input of an error code or an indication of an operational or configuration problem to a possible source of the code or problem.

Clause 37. The method of clause 35, wherein the provided customer service assistance is determined by a rule-set that maps an input of an error code or an indication of an operational or configuration problem to a possible solution to the code or problem.

Clause 38. The method of clause 35, wherein the provided customer service assistance is determined by inputting at least part of the collected set of information related to the customer and the collected set of information related to the current state of the device or service into a trained model.

Clause 39. The method of clause 38, wherein the trained model is a machine learning model.

It should be understood that embodiments as described herein can be implemented in the form of control logic using computer software in a modular or integrated manner. Based on the disclosure and teachings provided herein, a person of ordinary skill in the art will know and appreciate other ways and/or methods to implement embodiments using hardware and a combination of hardware and software.

Any of the software components, processes or functions described in this application may be implemented as software code to be executed by a processor using any suitable computer language such as Python, Java, JavaScript, C++ car Perl using conventional or object-oriented techniques. The software code may be stored as a series of instructions, or commands in (or on) a non-transitory computer-readable medium, such as a random-access memory (RAM), a read only memory (ROM), a magnetic medium such as a hard-drive or a floppy disk, or an optical medium such as a CD-ROM. In this context, a non-transitory computer-readable medium is almost any medium suitable for the storage of data or an instruction set aside from a transitory waveform. Any such computer readable medium may reside on or within a single computational apparatus and may be present on or within different computational apparatuses within a system or network.

According to one example implementation, the term processing element or processor, as used herein may be a central processing unit (CPU), or conceptualized as a CPU (such as a virtual machine). In this example implementation, the CPU or a device in which the CPU is incorporated may be coupled, connected, and/or in communication with one or more peripheral devices, such as display. In another example implementation, the processing element or processor may be incorporated into a mobile computing device, such as a smartphone or tablet computer.

The non-transitory computer-readable storage medium referred to herein may include a number of physical drive units, such as a redundant array of independent disks (RAID), a floppy disk drive, a flash memory, a USB flash drive, an external hard disk drive, thumb drive, pen drive, key drive, a High-Density Digital Versatile Disc (HD-DVD) optical disc drive, an internal hard disk drive, a Blu-Ray optical disc drive, or a Holographic Digital Data Storage (HDDS) optical disc drive, synchronous dynamic random access memory (SDRAM), or similar devices or other forms of memories based on similar technologies. Such computer-readable storage media allow the processing element or processor to access computer-executable process steps, application programs and the like, stored on removable and non-removable memory media, to off-load data from a device or to upload data to a device. As mentioned, with regards to the embodiments described herein, a non-transitory computer-readable medium may include almost any structure, technology or method apart from a transitory waveform or similar medium.

Certain implementations of the disclosed technology are described herein with reference to block diagrams of systems, and/or to flowcharts or flow diagrams of functions, operations, processes, or methods. It will be understood that one or more blocks of the block diagrams, or one or more stages or steps of the flowcharts or flow diagrams, and combinations of blocks in the block diagrams and stages or steps of the flowcharts or flow diagrams, respectively, may be implemented by computer-executable program instructions. Note that in some embodiments, one or more of the blocks, or stages or steps may not necessarily need to be performed in the order presented or may not necessarily need to be performed at all.

These computer-executable program instructions may be loaded onto a general-purpose computer, a special purpose computer, a processor, or other programmable data processing apparatus to produce a specific example of a machine, such that the instructions that are executed by the computer, processor, or other programmable data processing apparatus create means for implementing one or more of the functions operations, processes or methods described herein. These computer program instructions may also be stored in a computer-readable memory that may direct a computer or other programmable data processing apparatus to function in a specific manner, such that the instructions stored in the computer-readable memory produce an article of manufacture including instruction means that implement one or more of the functions, operations, processes, or methods described herein.

While certain implementations of the disclosed technology have been described in connection with what is presently considered to be the most practical and various implementations, it is to be understood that the disclosed technology is not to be limited to the disclosed implementations. Instead, the disclosed implementations are intended to cover various modifications and equivalent arrangements included within the scope of the appended claims. Although specific terms are employed herein, they are used in a generic and descriptive sense only and not for purposes of limitation.

This written description uses examples to disclose certain implementations of the disclosed technology, and also to enable any person skilled in the art to practice certain implementations of the disclosed technology, including making and using any devices or systems and performing any incorporated methods. The patentable scope of certain implementations of the disclosed technology is defined in the claims, and may include other examples that occur to those skilled in the art. Such other examples are intended to be within the scope of the claims if they have structural and/or functional elements that do not differ from the literal language of the claims or if they include structural and/or functional elements with insubstantial differences from the literal language of the claims.

All references, including publications, patent applications, and patents, cited herein are hereby incorporated by reference to the same extent as if each reference were individually and specifically indicated to be incorporated by reference and/or were set forth in its entirety herein.

The use of the terms "a" and "an" and "the" and similar referents in the specification and in the following claims are to be construed to cover both the singular and the plural, unless otherwise indicated herein or dearly contradicted by context. The terms "having," "including," "containing" and similar referents in the specification and in the following claims are to be construed as open-ended terms (e.g., meaning "including, but not limited to,") unless otherwise noted. Recitation of ranges of values herein are merely indented to serve as a shorthand method of referring individually to each separate value inclusively falling within the range, unless otherwise indicated herein, and each separate value is incorporated into the specification as if it were individually recited herein. All methods described herein may be performed in any suitable order unless otherwise indicated herein or clearly contradicted by context. The use of any and all examples, or exemplary language (e.g., "such as") provided herein, is intended merely to better illuminate embodiments and does not pose a limitation to the scope of the invention unless otherwise claimed. No language in the specification should be construed as indicating any non-claimed element as essential to an embodiment of the invention.

Different arrangements of the components depicted in the drawings or described above, as well as components and steps not shown or described are possible. Similarly, some features and sub-combinations are useful and may be employed without reference to other features and sub-combinations. Embodiments have been described for illustrative and not restrictive purposes, and alternative embodiments will become apparent to readers of this disclosure. Accordingly, the present invention is not limited to the embodiments described above or depicted in the drawings, and various embodiments and modifications may be made without departing from the scope of the claims below.

That which is claimed is:

1. A method for providing a customer of a company with assistance, comprising:
   receiving a set of information from a first device, wherein the information includes contextual information related to one or more of the customer, the first device, an application, or a problem encountered by the customer for which they are seeking assistance;
   generating a transferable code or token that allows access to the set of information received from the first device;
   providing the generated code or token to the company;
   receiving the generated code or token from a second and different device than the first device;
   verifying the received code or token;
   if the code or token is verified, then using the code or token to access the set of information received from the first device; and
   based on the accessed information, providing the customer with the assistance, wherein the assistance is provided to the customer through the second device.

2. The method of claim 1, wherein the information received from the first device comprises one or more of a customer name, customer contact information, customer location, and a place of purchase of the device, and may comprise information that can be used to authenticate the customer.

3. The method of claim 1, wherein the information received from the first device comprises one or more of a device type, model, serial number, firmware version, software version, status, configuration, error code, and an indication of an operational or configuration problem related to the first device.

4. The method of claim 1, wherein the method further comprises storing the information received from the first device in a secure data storage element, wherein the secure data storage element is remote from the first device.

5. The method of claim 1, wherein the code or token is received from the second device in one or more of a text, a link an image, an email, or as data provided to a website.

6. The method of claim 1, wherein providing the customer with the assistance further comprises one of sending a text message or email to the customer, calling the customer, directing the customer to a website, directing the customer to an in-application digital support experience, starting a messaging conversation, or initiating a bot to converse with the customer.

7. The method of claim 1, further comprising causing the generated code or token to be presented to the customer as an image on the first device, as a link that can be presented digitally on the first device, as part of a text or message, or as data contained in a component configured to transfer that data to the customer.

8. The method of claim 1, wherein at least some of the information received from the the first device is collected in advance of the customer needing the assistance.

9. The method of claim 1, wherein at least some of the information received from the first device is collected substantially contemporaneously with the customer needing the assistance.

10. A system for providing assistance to a customer of a company, comprising:
   one or more electronic processors configured to execute a set of computer-executable instructions;
   one or more non-transitory electronic data storage media containing the set of computer-executable instructions, wherein when executed, the instructions cause the one or more electronic processors to
      receive a set of information from a first device, wherein the information includes contextual information related to one or more of the customer, the first device, an application, or a problem encountered by the customer for which they are seeking assistance;
      generate a transferable code or token that allows access to the set of information received from the first device;
      provide the generated code or token to the company;
      receive the generated code or token from a second and different device than the first device;
      verify the received code or token;
      if the code or token is verified, then use the code or token to access the set of information received from the first device; and
      based on the accessed information, provide the customer with the assistance, wherein the assistance is provided to the customer through the second device.

11. The system of claim 10, wherein the instructions cause the one or more electronic processors to present the code or token to the customer as an image on the first device, as part of a text or message, or as data contained in a component configured to transfer that data to the customer.

12. The system of claim 10, wherein the information received from the first device comprises one or more of a customer name, customer contact information, customer location, and a place of purchase of the device and may comprise information that can be used to authenticate the customer.

13. The system of claim 10, wherein the information received from the first device comprises one or more of a device type, model, serial number, firmware version, software version, status, configuration, error code, and an indication of an operational or configuration problem related to the first device.

14. The system of claim 10, wherein the code or token is received from the second device in one or more of a text, a link, an image, an email, or as data provided to a website.

15. The system of claim 10, wherein providing the customer with the assistance further comprises one of sending a text message or email to the customer, calling the customer, directing the customer to a website, directing the customer to an in-application digital support experience, starting a messaging conversation, or initiating a bot to converse with the customer.

16. The system of claim 10, wherein prior to receiving at least some of the set of information from the first device, the company receives an indication of a need for assistance from the customer or from the first device.

17. The system of claim 10, wherein at least some of the information received from the first device is collected substantially contemporaneously with the customer needing the assistance.

18. One or more non-transitory computer-readable media comprising a set of computer-executable instructions that when executed by one or more programmed electronic processors, cause the processors to provide assistance to a customer of a company by:
   receiving a set of information from a first device, wherein the information includes contextual information related to one or more of the customer, the first device, an application or a problem encountered by the customer for which they are seeking assistance;
   generating a transferable code or token that allows access to the set of information received from the first device;
   providing the generated code or token to the company;
   receiving the generated code or token from a second and different device than the first device;
   verifying the received code or token;
   if the code or token is verified, then using the code or token to access the set of information received from the first device; and
   based on the accessed information, providing the customer with the assistance, wherein the assistance is provided to the customer through the second device.

19. The one or more non-transitory computer-readable media of claim 18, wherein at least some of the information received from the first device is collected substantially contemporaneously with the customer needing the assistance.

20. The one or more non-transitory computer-readable media of claim 18, further comprising instructions that cause the processors to present the code or token to the customer as an image on the first device, as a link that can be presented digitally on the first device, as part of a text or message, or as data contained in a component configured to transfer that data to the customer.

21. A method for providing assistance to a customer, comprising:
   receiving information related to a first device from a company;
   generating a transferable token or code that allows access to the information about the first device;
   providing the generated code or token to the company;
   receiving the token or code from the customer, the token or code provided by a second device different than the first device;
   in response to receiving the token or code, verifying the token or code; and
   if the token or code is verified, then allowing the customer to access the information related to the first device on the second device.

22. The method of claim 21, further comprising causing the token or code to be provided to the customer after the code or token is provided to the company, wherein the code or token is provided to the customer by one or more of being displayed to the customer by a display on the first device or by a display placed adjacent to the first device.

23. The method of claim 21, wherein the token or code is a scannable token or code.

24. The method of claim 21, wherein the information related to the first device is one or more of configuration or warranty information, or instructions for use.

\* \* \* \* \*